United States Patent
Mian et al.

(10) Patent No.: US 10,160,117 B2
(45) Date of Patent: Dec. 25, 2018

(54) PRE-SCREENING FOR ROBOTIC WORK

(71) Applicant: International Electronic Machines Corporation, Troy, NY (US)

(72) Inventors: Zahid F. Mian, Loudonville, NY (US); Ronald W. Gamache, East Greenbush, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 15/082,391

(22) Filed: Mar. 28, 2016

(65) Prior Publication Data

US 2016/0207203 A1 Jul. 21, 2016

Related U.S. Application Data

(63) Continuation of application No. 14/306,770, filed on Jun. 17, 2014, now Pat. No. 9,296,108.

(Continued)

(51) Int. Cl.
*G01C 21/00* (2006.01)
*B25J 9/16* (2006.01)
(Continued)

(52) U.S. Cl.
CPC ........ *B25J 9/1697* (2013.01); *G06K 9/00664* (2013.01); *G06K 9/00671* (2013.01);
(Continued)

(58) Field of Classification Search
CPC ............... B25J 9/1697; G06K 9/00664; G06K 9/00671; G06K 9/6215; G06T 7/0074;
(Continued)

(56) References Cited

U.S. PATENT DOCUMENTS 5,531,337 A * 7/1996 Cappelletti .............. B61G 7/04
 213/211
5,531,447 A * 7/1996 Nagasaka ........... A63F 3/00634
 273/249

(Continued)

FOREIGN PATENT DOCUMENTS

| CN | 200964120 Y | 10/2007 |
|---|---|---|
| CN | 202583081 U | 12/2012 |
| EP | 2335885 A1 | 6/2011 |

OTHER PUBLICATIONS

Jen, M., U.S. Appl. No. 14/306,770, Notice of Allowance, dated Nov. 18, 2015, 25 pages.

(Continued)

*Primary Examiner* — Ian Jen
(74) *Attorney, Agent, or Firm* — LaBatt, LLC

(57) ABSTRACT

A solution for pre-screening an object for further processing is provided. A pre-screening component can acquire image data of the object and process the image data to identify reference target(s) corresponding to the object, which are visible in the image data. Additionally, the pre-screening component can identify, using the reference target(s), the location of one or more components of the object. The pre-screening component can provide pre-screening data for use in further processing the object, which includes data corresponding to the set of reference targets and the location of the at least one component. A reference target can be, for example, an easily identifiable feature of the object and the component can be relevant for performing an operation on the object.

20 Claims, 9 Drawing Sheets

Related U.S. Application Data

(60) Provisional application No. 61/956,790, filed on Jun. 17, 2013.

(51) Int. Cl.
  *G06K 9/00* (2006.01)
  *G06K 9/62* (2006.01)
  *G06T 7/73* (2017.01)

(52) U.S. Cl.
  CPC .............. *G06K 9/6215* (2013.01); *G06T 7/74* (2017.01); *G05B 2219/37555* (2013.01); *G05B 2219/45083* (2013.01); *G06T 2207/30236* (2013.01); *G06T 2207/30252* (2013.01); *Y10S 901/01* (2013.01); *Y10S 901/47* (2013.01)

(58) Field of Classification Search
  CPC . G06T 2207/30236; G06T 2207/30252; Y10S 901/01; Y10S 901/47
  See application file for complete search history.

(56) References Cited

U.S. PATENT DOCUMENTS

| | | | | |
|---|---|---|---|---|
| 7,412,899 | B2* | 8/2008 | Mian | G07C 3/00 340/870.18 |
| 8,140,250 | B2 | 3/2012 | Mian et al. | |
| 2001/0043718 | A1 | 11/2001 | Laumeyer et al. | |
| 2003/0043019 | A1* | 3/2003 | Tanaka | G01C 21/26 340/5.64 |
| 2007/0064244 | A1* | 3/2007 | Mian | B61K 9/12 356/601 |
| 2009/0049936 | A1* | 2/2009 | Mian | G01M 17/10 73/865.8 |
| 2009/0055043 | A1* | 2/2009 | Mian | B61L 27/0094 701/31.4 |
| 2010/0076631 | A1* | 3/2010 | Mian | G05D 1/0229 701/19 |
| 2010/0100275 | A1* | 4/2010 | Mian | G01M 17/013 701/31.4 |
| 2011/0024576 | A1* | 2/2011 | Kilian | B61K 9/06 246/169 A |
| 2012/0192756 | A1* | 8/2012 | Miller | B61K 9/08 104/2 |
| 2012/0274772 | A1* | 11/2012 | Fosburgh | B61K 9/08 348/149 |
| 2013/0083188 | A1* | 4/2013 | Mian | B60T 17/228 348/135 |

OTHER PUBLICATIONS

Nho, PCT/US2014/042681, International Search Report and Written Opinion, dated Oct. 15, 2014, 14 pages.
Dasgupta, D., Australian Application No. 2014281656, Examination Report1, dated Sep. 19, 2016, 2 pages.
Citic, G., European Application No. 14814376.1, Extended Search Report, dated Mar. 9, 2017, 8 pages.
Dasgupta, D., Australian Application No. 2014281656, Examination Report2, dated Mar. 27, 2017, 4 pages.
Xiaoke, S., Chinese Application No. 201480042359.3, Office Action1 with English translation, dated Jul. 4, 2017, 20 pages.
Wong, A., Australian Application No. 2014281656, Examination Report3, dated Sep. 4, 2017, 6 pages.
Xiaoke, S., Chinese Application No. 201480042359.3, Office Action2 (with English language summary), dated Apr. 4, 2018, 4 pages.
Wingenfeld, Susanne, European Application No. 14 814 376.1, Notice of Acceptance, dated May 15, 2018, 45 pages.
Wong, A., Australian Application No. 2017232042, Examination Report, dated Sep. 4, 2018, 4 pages.

* cited by examiner

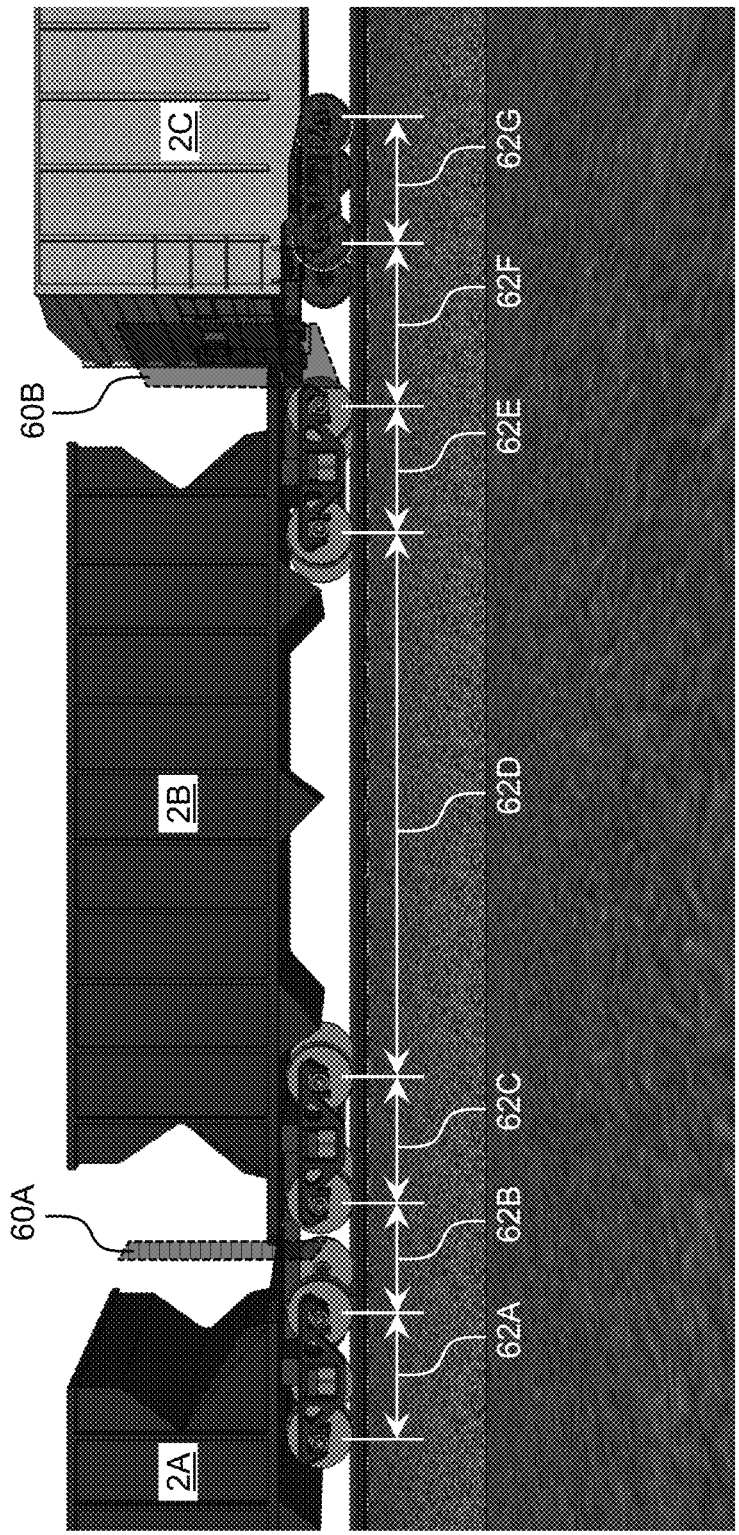

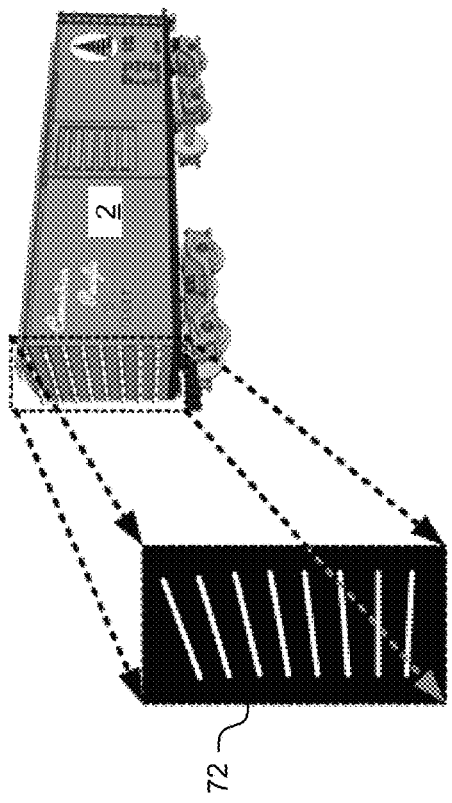
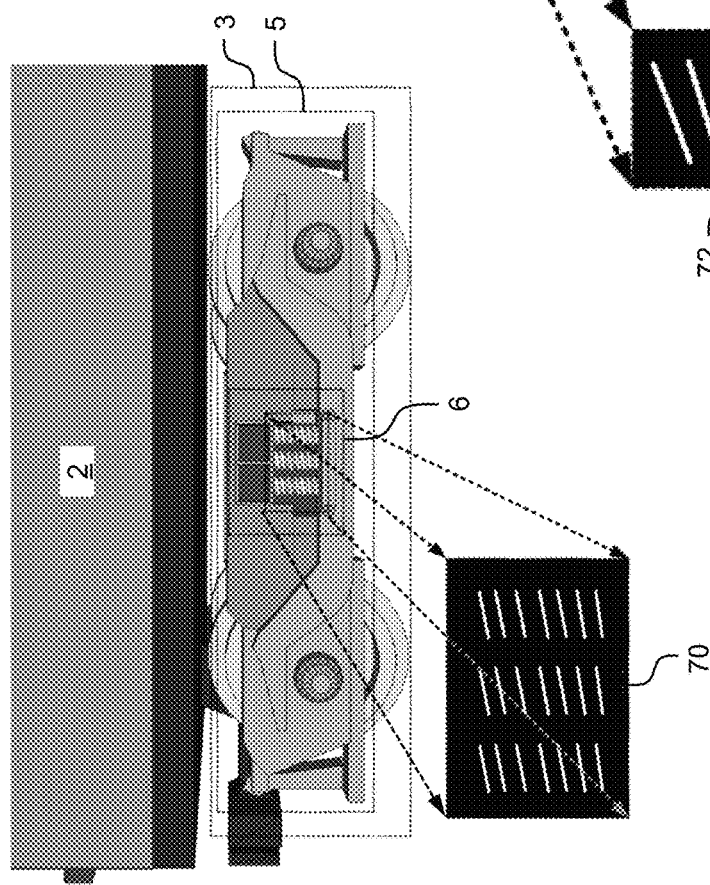

PRE-SCREENING FOR ROBOTIC WORK

REFERENCE TO RELATED APPLICATIONS

The current application is a continuation of U.S. patent application Ser. No. 14/306,770, which was filed on 17 Jun. 2014, and which claims the benefit of U.S. Provisional Application No. 61/956,790, which was filed on 17 Jun. 2013, each of which is hereby incorporated by reference.

TECHNICAL FIELD

The disclosure relates generally to robotic devices, and more particularly, to a solution for assisting robotic devices in recognizing objects in their environment.

BACKGROUND ART

It often is desirable to automate many operations currently performed by humans using a robotic device. For example, the operations may be repetitive, dangerous, and/or the like. However, successful automation using a robotic device requires that the robotic device have an understanding of the environment within which the robotic device is tasked with performing the operations.

A railyard is an illustrative example of an environment, in which is desirable to automate various operations generally performed by humans. For example, an individual present in the railyard will manually activate a cut lever (e.g., a coupler release handle) in order to separate two rail vehicles, manually activate a brake rod (e.g., an air system release lever) to bleed the brakes of a rail vehicle, and/or the like. In terms of the basic capability, any individual capable of physically travelling along the tracks in the railyard and exerting the required force will have no problem performing these relatively straightforward operations. However, humans in these settings are quite expensive, costing $50/hour or more. More importantly, such operations in an environment where the rail vehicles may be moving is quite hazardous. A single misstep can cause anything from bruises to death. Humans also tire relatively easily and cannot always keep track of all events that may occur while performing what are, mostly, boring and repetitive tasks.

One approach proposes an automated, stationary pin-puller for railcars, which recognizes the target pin and associated components and then performs a pin-pull. However, the discussion does not address various issues associated with real world applications, including recognizing the target in multiple confounding circumstances, movement of rail vehicles at varying speeds, and/or the like. For example, a rail vehicle moving a higher than normal rate of speed will not permit the pin to be successfully pulled in the short window of time between the pin and associated hardware becoming visible to the system and the following car moving into that space. As a result, a collision of the pin-pulling arm with the following car could result, likely severely damaging or destroying the automated pin-puller. Furthermore, a location at which the pin can be pulled can vary based on the length and load on the rail vehicle being separated, which can present a challenge in implementing a fixed location pin-puller.

An illustrative example of a robotic device which can be used to automate or semi-automate rail operations is shown and described in U.S. Patent Application Publication No. 2010/0076631, which is hereby incorporated by reference. As described therein, the robotic device can be configured to operate in a railyard, and be tasked with various operations relating to the processing of rail vehicles on consists located in the railyard at particular locations. For example, the robotic device can be configured to operate autonomously or semi-autonomously to activate a cut lever in order to separate two rail vehicles, activate a brake rod to bleed the brakes of a rail vehicle, and/or the like. Successful operation by the robotic device requires an ability of the robotic device to recognize individual rail vehicles, locate the cut lever and/or brake rod, and activate the cut lever or brake rod as needed, while distinguishing the real targets from multiple false targets. Additionally, the robotic device generally requires an understanding of the attributes of the scene, such as the forces acting on the rail vehicles.

A robotic device moving alongside a track is uniquely challenged in trying to recognize small targets. Unlike human beings, who have an immense amount of evolved, dedicated biological hardware and instinct which are focused around understanding what they see in their environment, even the best robotic devices do not actually "understand" what their cameras "see". A robotic device must carefully analyze a scene using various heuristics and algorithms and determine whether a given set of characteristics is present. Unfortunately, for many potential targets, the simple target characteristics—loops, straight lines, etc.—which can be derived by a reasonable-sized computational platform in real time can result in many false positives.

For example, a robotic device attempting to locate a brake rod that ends in a loop may identify multiple loops in image data acquired by the cameras, including those from lettering or shadows, and can have a significant challenge in trying to determine which of these loops is, in fact, the brake rod, or whether the robotic device is even in the correct location to locate the brake rod. This is further exacerbated since a moving robotic device will be changing its angle of view in three dimensions as it moves, may go over bumps or into dips of the landscape, or can vibrate going over rough terrain. As a result, the robotic device can have difficulty in determining a precise location or bearing of the target.

A robotic device could be configured to implement more complex methods to reduce or eliminate uncertainty in analyzing the environment. However, such methods require considerable computation time, which can make real time implementation on a mobile platform, whose mobility itself introduces considerable additional difficulty to the problem, impractical or impossible.

Some approaches seek to perform major computations in real time using a stationary processing system located some reasonable distance from the operating robotic device. Such an approach reduces a need for carrying the computational capability onboard the robotic device, but still requires an extremely powerful system to perform in real-time, and introduces an additional major challenge of bandwidth for the communications between the robotic device and the stationary system. For example, in order to produce good results, the station system should have the same data available as the robotic device. In this case, all of the data gathered by the robotic device's vision system must be transmitted to the stationary system. For good resolution and accuracy in field conditions, reasonably high-resolution cameras must be used, and for a moving vehicle, the frame rate should be at least thirty frames per second and perhaps higher. For a full-color camera, even with some compression, this translates to tens of megabytes per second over a wireless channel, or hundreds of megabits per second (Mbps). Common wireless methods such as "WiFi" (802.11 standards) can barely exceed 100 Mbps in current incarnations. As a result, use of such an approach in commercial settings is expensive and in many cases completely impractical.

SUMMARY OF THE INVENTION

Aspects of the invention provide a solution for pre-screening an object for further processing. A pre-screening component can acquire image data of the object and process the image data to identify reference target(s) corresponding to the object, which are visible in the image data. Additionally, the pre-screening component can identify, using the reference target(s), the location of one or more components of the object. The pre-screening component can provide pre-screening data for use in further processing the object, which includes data corresponding to the set of reference targets and the location of the at least one component. A reference target can be, for example, an easily identifiable feature of the object and the component can be relevant for performing an operation on the object.

A first aspect of the invention provides a system comprising: a robotic device configured to perform an operation on a vehicle in an autonomous or semi-autonomous manner at a operation location; and a pre-screening component including: a set of cameras for acquiring image data of a vehicle moving past a pre-screening location prior to moving into the operation location; and a computer system for pre-screening the vehicle by performing the following: processing the image data to identify a set of reference targets corresponding to the vehicle visible in the image data; identifying, using the set of reference targets, a location of at least one component of the vehicle relevant to the operation to be performed on the vehicle by the robotic device; and providing pre-screening data for use by the robotic device in performing the operation, wherein the pre-screening data includes data corresponding to the set of reference targets and the location of the at least one component.

A second aspect of the invention provides a system comprising: a pre-screening component including: a set of cameras for acquiring image data of an object; and a computer system for pre-screening the object by performing the following: processing the image data to identify a set of reference targets corresponding to the object visible in the image data; identifying, using the set of reference targets, a location of at least one component of the object; and providing pre-screening data for use in further processing the object, wherein the pre-screening data includes data corresponding to the set of reference targets and the location of the at least one component.

A third aspect of the invention provides a railyard comprising: a robotic device configured to perform an operation on rail vehicles in an autonomous or semi-autonomous manner at a operation location; and a pre-screening component including: a set of cameras for acquiring image data of each rail vehicle moving past a pre-screening location prior to moving into the operation location; and a computer system for pre-screening the rail vehicle by performing the following: processing the image data to identify a set of reference targets corresponding to the rail vehicle visible in the image data, wherein each reference target in the set of reference targets comprises an easily recognized feature of the rail vehicles; identifying, using the set of reference targets, a location of at least one component of the rail vehicle relevant to the operation to be performed on the rail vehicle by the robotic device; and providing pre-screening data for use by the robotic device in performing the operation, wherein the pre-screening data includes data corresponding to the set of reference targets and the location of the at least one component.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 5 shows a simulation of three connected rail vehicles, which can be analyzed to determine the respective separation locations according to an embodiment.

FIGS. 6A and 6B show an illustrative spring box of a rail vehicle and principals for identifying the spring box in image data according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
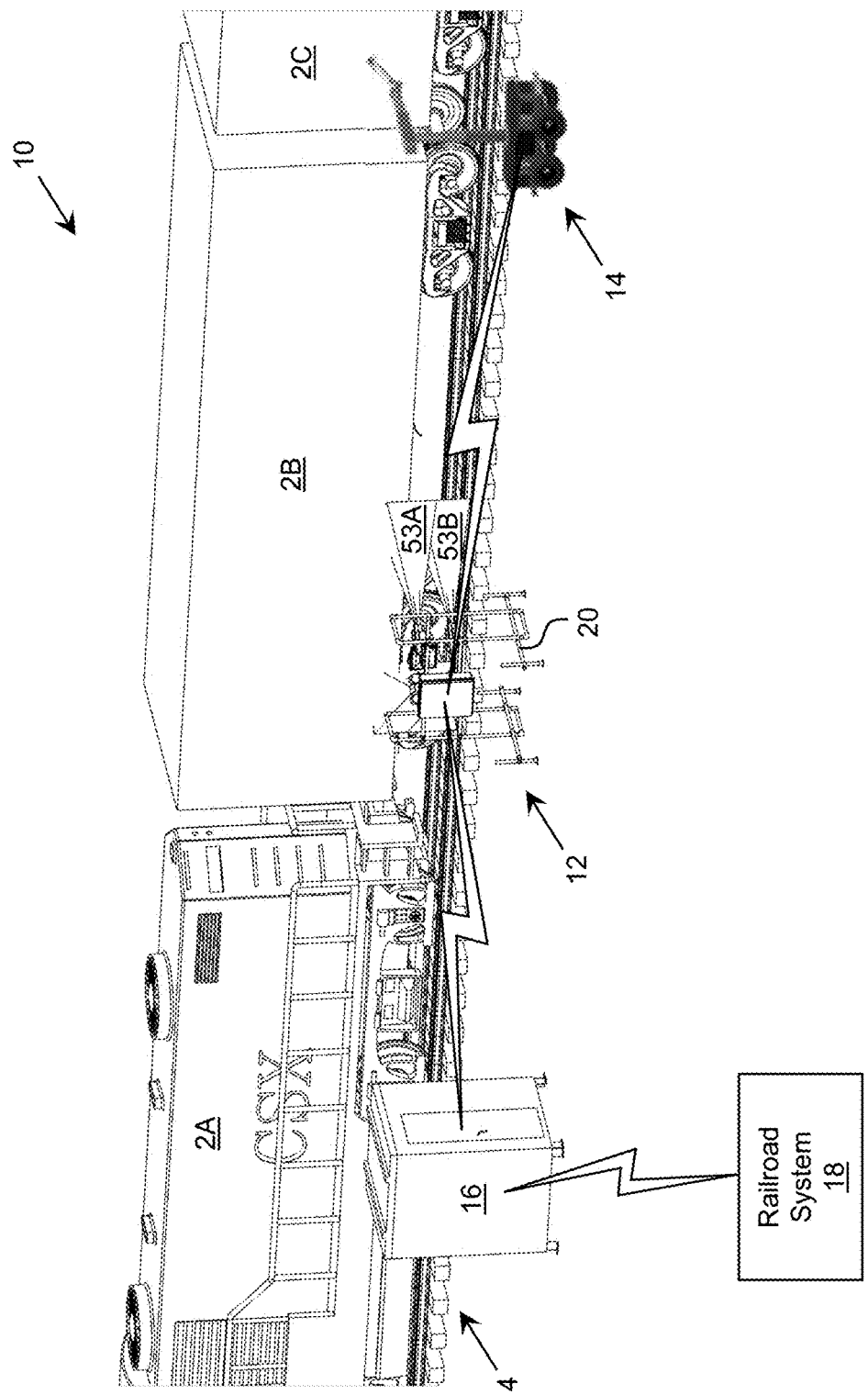
FIG. 1 shows an illustrative environment for processing rail vehicles according to an embodiment.

As indicated above, aspects of the invention provide a solution for pre-screening an object for further processing. A pre-screening component can acquire image data of the object and process the image data to identify reference target(s) corresponding to the object, which are visible in the image data. Additionally, the pre-screening component can identify, using the reference target(s), the location of one or more components of the object. The pre-screening component can provide pre-screening data for use in further processing the object, which includes data corresponding to the set of reference targets and the location of the at least one component. A reference target can be, for example, an easily identifiable feature of the object and the component can be relevant for performing an operation on the object. As used herein, unless otherwise noted, the term "set" means one or more (i.e., at least one) and the phrase "any solution" means any now known or later developed solution.

Aspects of the invention provide a solution for processing various objects, such as vehicles moving through a given region. The processing can include performing one or more operations on an object using a robotic device. A pre-screening component can first obtain information on the object and provide such information for use by the robotic device. In an embodiment, the information includes data to assist the robotic device in identifying one or more relevant components of the object in image data acquired for the object in order to perform the operation(s). The solution also can acquire other data on the object, e.g., from previous processing of the object, an industry database regarding the object, and/or the like, which can also be provided for use by the pre-screening component and/or robotic device. Furthermore, the solution can provide a solution for effectively storing and/or communicating the information regarding the object, tracking changes in the object over time, detecting anomalies present in an object, predicting future conditions of the object, and/or the like.

Further aspects of the invention are shown and described in conjunction with an illustrative railyard application. In particular, the railyard includes a pre-screening component configured to acquire data regarding all passing rail vehicles, examine the data, and determine various data regarding each passing rail vehicle. The pre-screening component can provide the data for use in further processing the rail vehicle in the railyard. For example, as trains arrive at a railyard, the rail vehicles are separated and sorted into consists, which are subsequently assembled into new trains and leave the railyard. To allow such operations, many repetitive tasks are performed on the rail vehicles. An illustrative operation is bleeding the brakes of a rail vehicle. In this operation, a brake rod is operated, generally twice to assure a fully successful bleed, to cause a release of compressed air.

To perform such an operation using a robotic device, the device must be able to locate a brake rod, which is generally a simple rod of metal that may or may not have a loop at the end, and pull the brake rod, ideally at least twice, with sufficient force to release the compressed air. A significant challenge for a robotic device attempting to autonomously perform this action is developing an understanding of the entire field (e.g., the gap region between two adjacent rail vehicles) within a timeframe that provides sufficient time for the robotic device to complete the operation. Such a challenge is compounded when the robotic device is a mobile device, which may need to analyze image data acquired by a moving, vibrating platform traveling on uneven terrain. In an embodiment, the pre-screening component provides data regarding a specific type of rail vehicle, a location of an easily recognized target which can serve as a reference target for a local coordinate origin, locations and/or descriptions of components relevant to the operations of interest, and/or the like, for use by the robotic device in performing the operation(s), such as bleeding the brakes.

Turning to the drawings, FIG. 1 shows an illustrative environment 10 for processing rail vehicles 2A-2C according to an embodiment. For example, the environment 10 can correspond to an entrance track 4 to a railyard. The environment 10 includes a system for processing the rail vehicles 2A-2C, which can include a pre-screening component 12 including one or more components positioned near the track 4, a robotic device 14, and a remote system 16. During operation, the pre-screening component 12 can acquire raw data corresponding to the passing rail vehicles 2A-2C, process the raw data to generate rail vehicle data corresponding to each passing rail vehicle 2A-2C, and communicate some or all of the rail vehicle data and/or raw data for further processing by the robotic device 14, the remote system 16, and/or the like. The remote system 16 can include a transmission link (e.g., via more powerful transmitters) to another industry system, such as a railroad system 18, with which it can communicate data regarding the rail vehicles 2A-2C. While not shown for clarity, it is understood that the robotic device 14 and remote system 16 also can communicate directly. It is understood that transmissions between the pre-screening component 12, robotic device 14, the remote system 16, and/or the railroad system 18 can utilize any combination of various types of wired or wireless transmission solutions.

The pre-screening component 12 and the robotic device 14 can be spaced sufficiently apart to allow pre-screening data derived from raw data acquired by the pre-screening component 12 to be transmitted to and utilized by the robotic device 14 as it performs one or more operations. Such spacing will be dependent on the speed at which the rail vehicles 2A-2C are moving, an amount of time required to generate and transmit the pre-screening data, an amount of time required for the robotic device 14 to prepare to utilize the pre-screening data, and/or the like. To this extent, the spacing shown in FIG. 1 is only illustrative and is not intended to depict actual spacing in various applications. While shown located in a nearby bungalow, it is understood that the remote system 16 can be located any distance from the pre-screening component 12 and the robotic device 14.

Figure 2:
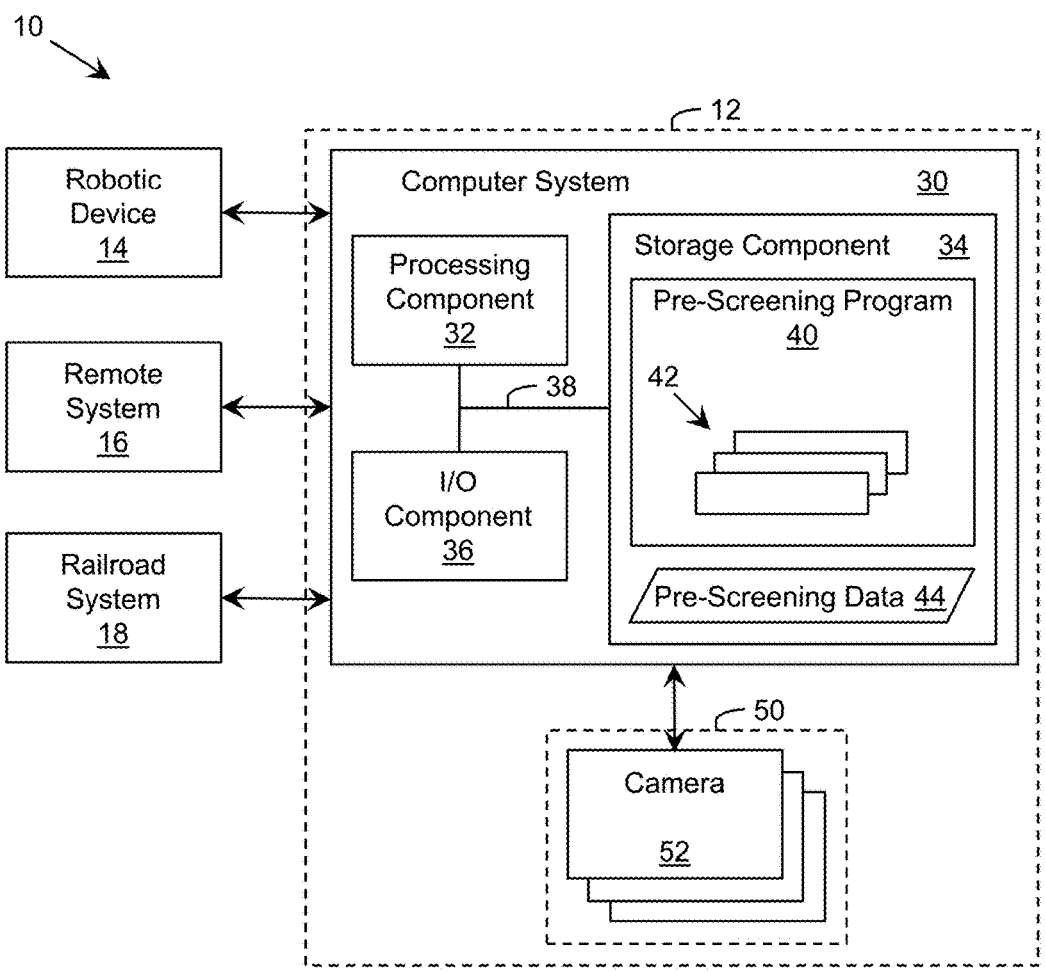
FIG. 2 shows a block diagram of an illustrative implementation of the environment for processing rail vehicles shown in FIG. 1 according to an embodiment.

FIG. 2 shows a block diagram of an illustrative implementation of the environment 10 for processing rail vehicles 2A-2C (FIG. 1) according to an embodiment. In this case, the environment 10 includes a pre-screening component 12, which includes a computer system 30 that can perform a process described herein in order to provide pre-screening data 44 regarding the rail vehicles 2A-2C for use by a robotic device 14, a remote system 16, a railroad system 18, and/or the like. In particular, the computer system 30 is shown including a pre-screening program 40, which makes the computer system 30 operable to pre-process the rail vehicles 2A-2C by performing a process described herein.

The computer system 30 is shown including a processing component 32 (e.g., one or more processors), a storage component 34 (e.g., a storage hierarchy), an input/output (I/O) component 36 (e.g., one or more I/O interfaces and/or devices), and a communications pathway 38. In general, the processing component 32 executes program code, such as the pre-screening program 40, which is at least partially fixed in storage component 34. While executing program code, the processing component 32 can process data, which can result in reading and/or writing transformed data from/to the storage component 34 and/or the I/O component 36 for further processing. The pathway 38 provides a communications link between each of the components in the computer system 30. The I/O component 36 can comprise one or more human I/O devices, which enable a human user to interact with the computer system 30 and/or one or more communications devices to enable a system user (e.g., the robotic device 14) to communicate with the computer system 30 using any type of communications link. To this extent, the pre-screening program 40 can manage a set of interfaces (e.g., graphical user interface(s), application program interface, and/or the like) that enable human and/or system users to interact with the pre-screening program 40. Furthermore, the pre-screening program 40 can manage (e.g., store, retrieve, create, manipulate, organize, present, etc.) the data, such as the pre-screening data 44, using any solution.

In any event, the computer system 30 can comprise one or more general purpose computing articles of manufacture (e.g., computing devices) capable of executing program code, such as the pre-screening program 40, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the pre-screening program 40 can be embodied as any combination of system software and/or application software.

Furthermore, the pre-screening program 40 can be implemented using a set of modules 42. In this case, a module 42 can enable the computer system 30 to perform a set of tasks used by the pre-screening program 40, and can be separately developed and/or implemented apart from other portions of the pre-screening program 40. As used herein, the term "component" means any configuration of hardware, with or without software, which implements the functionality described in conjunction therewith using any solution, while the term "module" means program code that enables a computer system 30 to implement the actions described in conjunction therewith using any solution. When fixed in a storage component 34 of a computer system 30 that includes a processing component 32, a module 42 is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 30.

When the computer system 30 comprises multiple computing devices, each computing device can have only a portion of the pre-screening program 40 fixed thereon (e.g., one or more modules 42). However, it is understood that the computer system 30 and the pre-screening program 40 are only representative of various possible equivalent computer systems that may perform a process described herein. To this extent, in other embodiments, the functionality provided by the computer system 30 and the pre-screening program 40 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 30 includes multiple computing devices, the computing devices can communicate over any type of communications link. Furthermore, while performing a process described herein, the computer system 30 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As described herein, the pre-screening component 12 includes a set of I/O devices 50, which can be operated by the computer system 30 to acquire pre-screening data 44 corresponding to passing rail vehicles 2A-2C. To this extent, the pre-screening component 12 can include a set of cameras 52, which are configured to acquire image data on the passing rail vehicles 2A-2C, which the computer system 30 can process to locate a set of reference targets and a set of components corresponding to a rail vehicle 2A-2C. Data corresponding to the set of reference targets and set of components can be provided for use by the robotic device 14.

Referring to FIGS. 1 and 2, as illustrated, the pre-screening component 12 can include one or more assemblies 20 (shown in FIG. 1) positioned at a fixed location near the track 4 using any temporary or permanent placement solution. A distance between the assembly 20 and the track 4 can be selected using any solution. In an embodiment, the distance is determined based on the requirements of the railroad (e.g., a minimum clearance from the track 4) and a particular imaging geometry selected for the application. Regardless, an assembly 20 can include a set of cameras 52 (labeled in FIG. 2), which are positioned on the assembly 20 in a manner that ensures that a target region of the passing rail vehicles 2A-2C is within the field of view of at least one of the set of cameras. This can be accomplished using multiple cameras 52 with overlapping fields of view 53A, 53B (shown in FIG. 1) at the target distance (e.g., a center of the track 4), a single camera (e.g., a high resolution camera) with a field of view at the target distance that is significantly larger than the target region, which is centrally located in the field of view, and/or the like.

The pre-screening component 12 can be configured to acquire and/or determine any combination of various pre-screening data 44 regarding each rail vehicle 2A-2C. For example, the pre-screening component 12 can obtain identification information for a rail vehicle 2A-2C. Such identification information can include: a position of the rail vehicle 2A-2C in a consist/train; a type of the rail vehicle 2A-2C (e.g., as determined from image processing); identification numbers read (e.g., imaged and processed) from a side of the rail vehicle 2A-2C; radio frequency identification (RFID) information corresponding to the rail vehicle 2A-2C transmitted by a tag, such as an automatic equipment identifier (AEI) tag, on the rail vehicle 2A-2C; and/or the like.

Furthermore, the pre-screening component 12 can evaluate the image data corresponding to the target region and identify a set of reference targets corresponding to a rail vehicle 2A-2C, which are visible in the image data. The set of reference targets can correspond to features of the rail vehicle 2A-2C, which can be used to locate target components (including areas) of the rail vehicle 2A-2C relevant to the operation(s) to be performed by the robotic device 14. Additionally, the pre-screening component 12 can identify a location of the target component(s) with respect to the set of reference targets.

The pre-screening component 12 can transmit the pre-screening data 44 for further processing by the robotic device 14 and/or the remote system 16. In an embodiment, the pre-screening data 44 includes data corresponding to the set of reference targets and/or location data for the component(s) of the rail vehicle 2A-2C. The pre-screening component 12 can transmit the pre-screening data 44 to the robotic device 14 for use by the robotic device 14 in performing operation(s) on the rail vehicle 2A-2C. In this case, the location of the pre-screening component 12 can be selected such that the robotic device 14 will receive the pre-screening data 44 with sufficient time to utilize the data as the rail vehicle 2A-2C passes the location at which the robotic device 14 will perform the operation(s).

The pre-screening component 12 can transmit pre-screening data 44 identifying each rail vehicle 2A-2C for processing by the remote system 16. For example, the remote system 16 can use the identifying data to update a historical record corresponding to the rail vehicle 2A-2C, obtain additional data corresponding to the rail vehicle 2A-2C from the railroad system 18, and/or the like. In an embodiment, the pre-screening component 12 can provide raw image data acquired for the rail vehicles 2A-2C, which can be processed by the remote system 16. In this case, the transmission link between the pre-screening component 12 and the remote system 16 will require sufficient bandwidth, and the remote system 16 can be equipped with significantly more processing power to perform the computations. Regardless, when the remote system 16 obtains/generates data for use by the robotic device 14 while performing operation(s) on the rail vehicles 2A-2C, the remote system 16 can transmit the data for use by the robotic device 14 in a timely manner.

Figure 3:
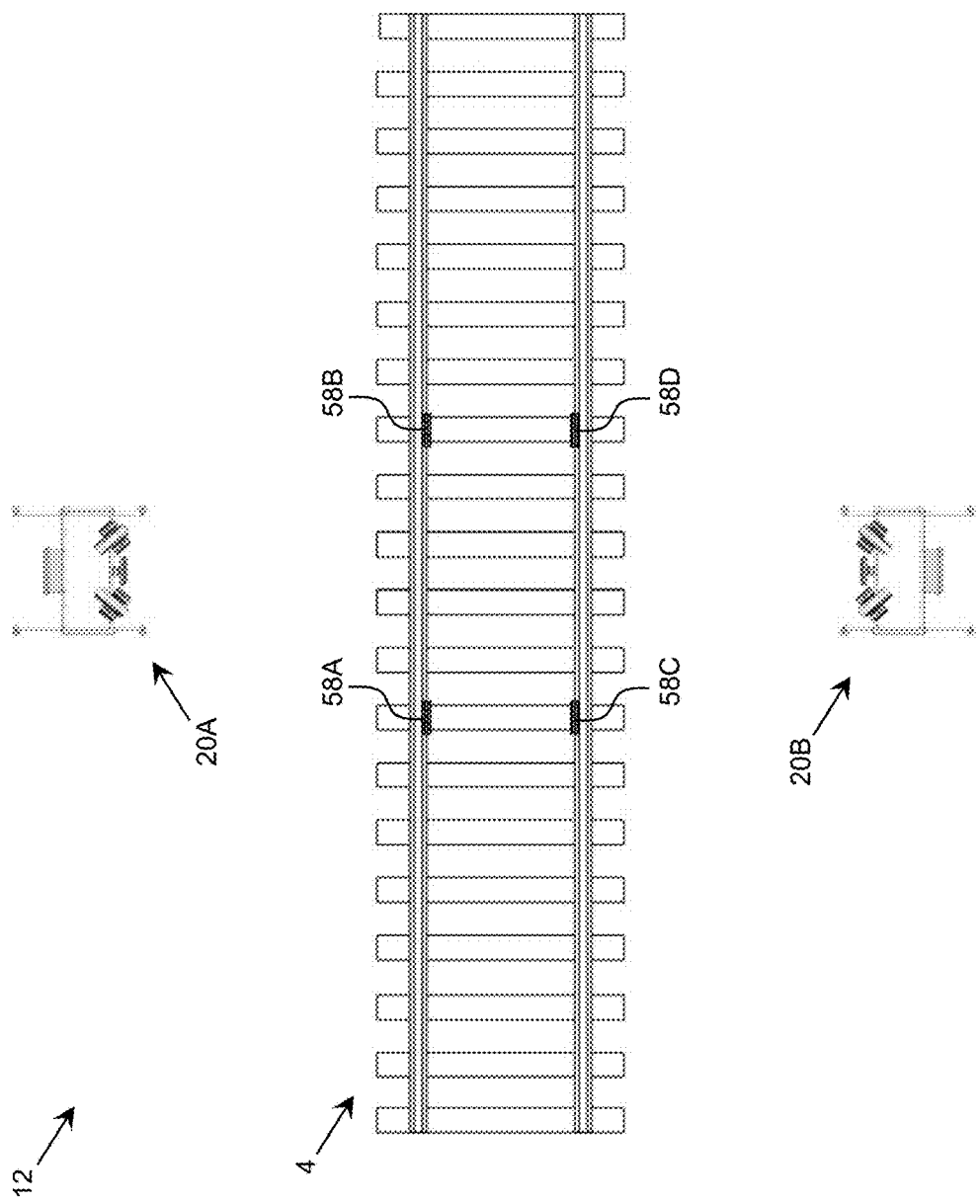
FIG. 3 shows a top view of an illustrative implementation of a pre-screening component according to an embodiment.

In an embodiment, the pre-screening component 12 includes multiple assemblies 20, each of which can be mobile or stationary. For example, the pre-screening component 12 can include a pair of assemblies 20 located on opposing sides of the track 4. To this extent, FIG. 3 shows a top view of an illustrative implementation of the pre-screening component 12 according to an embodiment. In this case, the pre-screening component 12 includes two assemblies 20A, 20B located on opposing sides of the track 4. While the assemblies 20A, 20B are shown located at the same location along the length of the track 4, it is understood that this need not be the case (e.g., when the geography of the location makes locating the assemblies 20A, 20B at the same location on the track 4 impractical). In this case, the data acquired by devices located on each assembly 20A, 20B will need to be matched with the corresponding locations on the rail vehicles 2A-2C using any solution, as the data will be acquired at different times. Furthermore, it is understood that while assemblies 20A, 20B are shown adjacent to the sides of a path of travel (e.g., the track 4), an assembly can be located differently, such as above or below the path of travel of a target object (e.g., embedded between the rails, supported over a top of the rails, and/or the like). Still further, while the assemblies 20A, 20B are shown approximately the same distance from the track 4, it is understood that the assemblies 20A, 20B can be located different distances from the track 4 (e.g., when different types of cameras are used, a different field of view is desired, and/or the like).

As described herein, each assembly 20A, 20B can include a set of cameras 52 (FIG. 2) configured to acquire image data (e.g., video) of rail vehicles, such as the rail vehicle 2B shown in FIG. 1, traveling along the track 4. In an embodiment, the assemblies 20A, 20B can be configured such that the fields of view of the cameras 52 located thereon are substantially similar, but on opposite sides of the rail vehicle 2B. Acquiring image data from both sides of the rail vehicle 2B can assist the pre-screening component 12 in locating one or more reference targets and/or components on the rail vehicle 2B. For example, a brake rod may be located on either side of the rail vehicle 2B and will therefore be more readily located in the image data acquired by a camera 52 on one of the assemblies 20A, 20B.

The pre-screening component 12 can be configured to acquire additional pre-screening data 44 (FIG. 2) regarding the target object, such as a rail vehicle 2B shown in FIG. 1. For example, the pre-screening component 12 can acquire timing information, which can enable the pre-screening component 12 (e.g., a computer system 30 (FIG. 2) included therein) to determine when image data was acquired for a rail vehicle 2B as well as divide a consist (e.g., train) of rail vehicles 2B into separate rail vehicles 2B. For example, the timing information can enable the pre-screening component 12 to match a particular video sequence with a particular event (e.g., a wheel passage).

To this extent, the pre-screening component 12 is also shown including wheel sensors 58A-58D, each of which can be located on an inside (gauge side) of a rail of the track 4 and can comprise any type of commercially available wheel sensor. While four gauge side sensors 58A-58D are shown, it is understood that this is only illustrative. Depending on requirements for an embodiment of a pre-screening component 12 and the type of sensors, a pre-screening component 12 can include any number of one or more wheel sensors 58A-58D placed in any manner to detect passing rail wheels, e.g., on either or both rails. During operation, the computer system 30 (FIG. 2) of the pre-screening component 12 can process sensing data acquired by the wheel sensors 58A-58D to determine wheel timing information, wheel speed, and/or the like, using any solution. For example, the pairs of wheel sensors 58A and 58B and 58C and 58D can be located a known distance apart, thereby providing sufficient information to enable the computer system 30 to approximate the speed at which the rail vehicle 2B is traveling.

Figure 4:
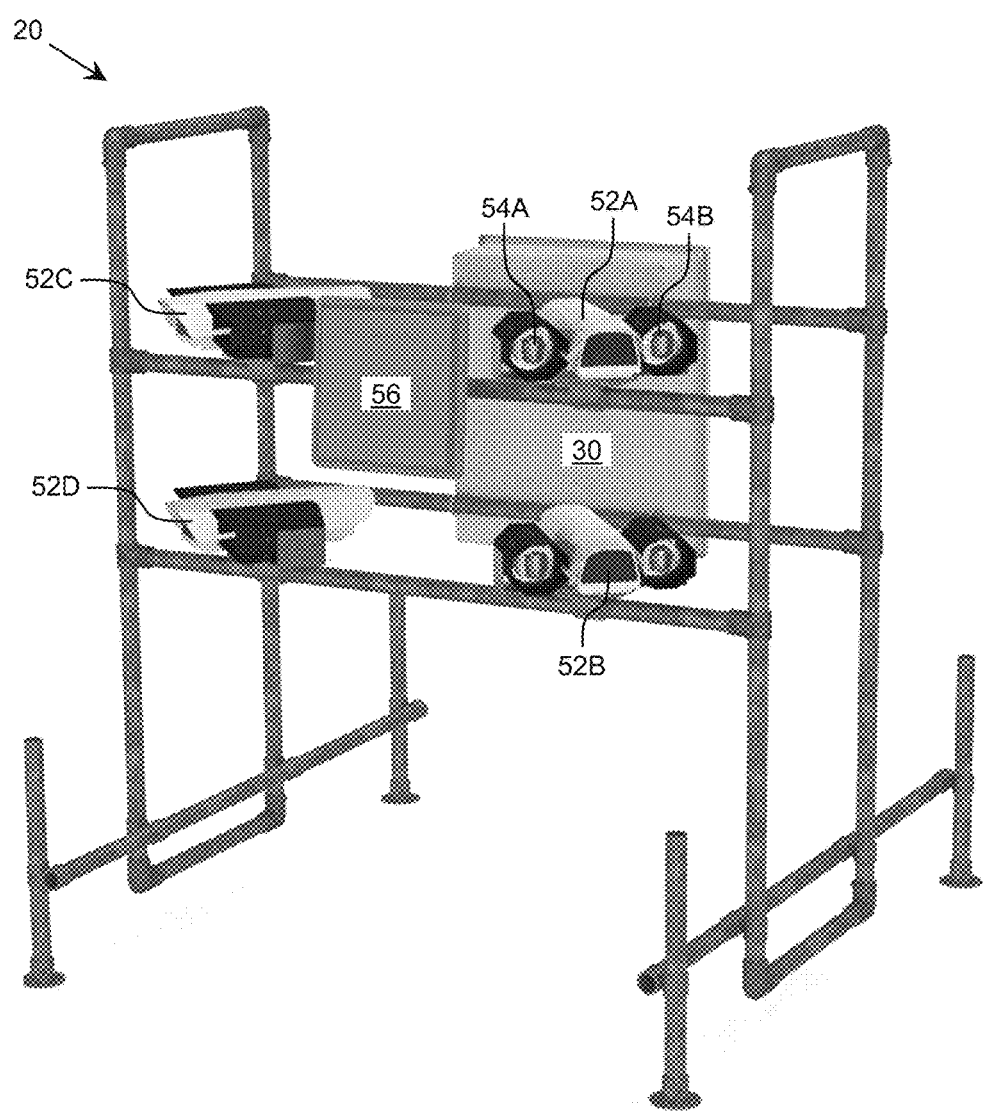
FIG. 4 shows an illustrative assembly, which can be implemented as part of a pre-screening component, according to an embodiment.

FIG. 4 shows an illustrative assembly 20, which can be implemented as part of a pre-screening component 12 (FIG. 1), according to an embodiment. As illustrated, the assembly 20 can be configured to be permanently or temporarily located in a fixed location. However, it is understood that this is only illustrative, and a mobile assembly can be utilized in an embodiment. Regardless, the assembly 20 is shown including a support framework, which can be configured to hold a computer system 30 and a set of I/O devices 50 (FIG. 2). While the support framework is shown including a combination of attached tubular members, it is understood that a support framework can be constructed in any manner to provide proper alignment and sufficient stability to enable effective operation of the various devices of the pre-screening component 12 installed thereon.

The assembly 20 is shown including four cameras 52A-52D. As illustrated, the cameras 52A-52D are configured to be operated in pairs, with cameras 52A, 52B providing a first pair, and cameras 52C, 52D providing a second pair. Each pair of cameras includes a first camera 52A, 52C having a high field of view (e.g., such as the field of view 53A shown in FIG. 1) configured to image a high section of the passing rail vehicles, and a second camera 52B, 52D having a low field of view (e.g., such as the field of view 52B shown in FIG. 1) configured to image a low section of the passing rail vehicles. This configuration can help ensure, among other things, that the brake rods of the passing rail vehicles are imaged by at least one of the cameras 52A-52D. In particular, a brake rod can be mounted having one of two general height categories, which are generally defined by a lower portion of the vehicle chassis or several feet higher up. In an embodiment, the fields of view 53A, 53B are configured such that one of the height categories is centrally located in the field of view 53A, 53B, and the fields of view 53A, 53B include some overlap, which can be used for verifying image registration data.

In an embodiment, the set of I/O devices 50 (FIG. 2) of a pre-screening component 12 (FIG. 2) can include one or more illuminators, which the computer system 30 can operate to ensure that sufficient lighting is present to acquire usable image data. For example, the assembly 20 is shown including a pair of illuminators 54A, 54B for each camera 52A. The illuminators 54A, 54B can be of any type necessary to produce a level and/or type of light required by the corresponding camera 52A. Illustrative illuminators 54A, 54B include standard incandescent, halogen, light emitting diode (LED) panel lighting, and/or the like. LED-based lighting can be preferred in many outdoor, long-term applications, as it is solid-state, easily ruggedized, and can produce sufficient lighting for the application described herein.

The set of I/O devices 50 also can include one or more other components for acquiring additional data regarding the passing rail vehicles. For example, the assembly 20 is shown including a RFID reader 56, such as an AEI tag reader. The RFID reader 56 can generate a radio frequency pulse to interrogate a tag located on a passing rail vehicle. The rail vehicle tag can respond to the pulse with information regarding the rail vehicle. Such information can include, for example, a specific numeric identifier of the rail vehicle, a type of rail vehicle, and/or the like. Such information can be used for tracking the rail vehicle during its operating lifetime, determining a location of a component, such as the brake rod, and/or the like. It is understood that the assembly 20 can include other devices, which are not shown for clarity. For example, in addition to the computer system 30, a communications component, power component, and/or the like, can be included on the assembly 20 (e.g., installed in the same physical housing as the computer system 30).

As described herein, the set of I/O devices 50 also can include various devices, such as the wheel sensors 58A-58D shown in FIG. 3, which can provide wheel speed measurement data for each wheel of a passing rail vehicle. Using the wheel speed measurement and timing of each wheel signal, the computer system 30 can calculate a distance between adjacent wheels passing by the pre-screening component 12. Furthermore, the computer system 30 can use the wheel spacing to determine a location corresponding to the coupling of two adjacent rail vehicles in a consist.

For example, FIG. 5 shows a simulation of three connected rail vehicles 2A-2C, which can be analyzed to determine the respective separation locations 60A, 60B according to an embodiment. In this case, each rail vehicle 2A-2C can include two wheel trucks, each of which includes two sets of wheels. As the rail vehicles 2A-2C pass by a pre-screening location, the computer system 30 (FIG. 2) can calculate a series of wheel spacings 62A-62G. As illustrated, the computer system 30 can readily classify the wheel spacings 62A-62G into short wheel spacings, such as wheel spacings 62A-62C and 62E-62G, and long wheel spacings, such as wheel spacing 62D, since there is a significant difference between the longest short wheel spacing 62A-62C and 62E-62G and the shortest long wheel spacing 62D.

As illustrated in FIG. 5, the computer system 30 can assume that the short distances will be seen between the wheels on the same wheel truck as well as the last wheel on a first rail vehicle, such as rail vehicle 2A, and the first wheel on an adjacent rail vehicle, such as rail vehicle 2B. Furthermore, for each separation location 60A, 60B, there will be a sequence of three consecutive short distances, such as wheel spacings 62A-62C, which is preceded and followed by a long distance, such as spacing 62D. From this, the computer system 30 can determine the separation location 60A, 60B as being approximately located at a center of the second of the three consecutive short distances, e.g., a center of the wheel spacings 62B, 62F, respectively. It is understood that the computer system 30 can account for the first wheel truck on the first rail vehicle and the last wheel truck on the last rail vehicle using any solution. Furthermore, it is understood that the computer system 30 can determine the separation locations 60A, 60B using a combination of one or more of any solution. For example, when the number of wheel trucks and rail wheels are known for each rail vehicle 2A, 2B, the computer system 30 can count the rail wheels and determine the center of the wheel spacing between the last rail wheel of a first rail vehicle 2A, and the first rail wheel of a next rail vehicle 2B.

Regardless, using the separation locations 60A, 60B, the computer system 30 can segment the image data acquired by the camera(s) 52 (FIG. 2) into entries for each individual rail vehicle 2A-2C, entries corresponding to the gaps between connected rail vehicles 2A-2C, and/or the like. Additionally, the computer system 30 can generate a reference coordinate system for use by, for example, the robotic device 14 (FIG. 2). In an embodiment, the reference coordinate system is based on a set of reference features of the object (e.g., rail vehicle 2A-2C), which can be readily located in image data by a computer system with fewer computational resources available and/or devoted to image processing than that available on the computer system 30. Furthermore, particularly when the robotic device 14 is a mobile device, the image data may have lower consistency and/or quality due to the camera(s) being in motion and/or vibrating when the image data is acquired. In a further embodiment, when available, the set of reference targets can include features that are generally invariant, always present, and/or the like.

For typical rail vehicles 2A-2C, the set of reference features can include a spring box of the rail vehicle 2A-2C, which can provide a reliably accurate local coordinate system for use by a robotic device 14 (FIG. 2). FIGS. 6A and 6B show an illustrative spring box 6 of a rail vehicle 2 and principals for identifying the spring box 6 in image data according to an embodiment. In FIG. 6A, a rail vehicle 2 includes a truck 3 including two wheels and a truck frame 5. The truck frame includes a spring box 6, which includes a bolster with springs located below the bolster. As shown in the enlarged view, processing image data 70 including the springs generally results in a series of diagonal, vertically stacked lines corresponding to the nearer, better-lit portions of the curve of the springs. These patterns are generally distinctive and generally present whenever a spring box 6 is imaged. Furthermore, truck frames 5 always include spring boxes 6.

Other objects present on a rail vehicle 2 could, upon video analysis, provide a similar pattern of lines. For example, FIG. 6B shows a number of large spaced corrugations on the rear of a rail vehicle 2 and the corresponding processed image data 72, which produces a pattern of lines superficially similar to those present in the image data 70. Other confounding patterns could be present in various circumstances, such as a cargo of springs, graffiti having similar linear components, smaller inclined corrugations on a portion of a rail vehicle 2 or cargo visible in a rail vehicle 2, and/or the like.

In an embodiment, the pre-screening component 12 (FIG. 2) and/or the robotic device 14 (FIG. 2) can mask areas of image data incapable of including a reference target, such as the spring box 6 of a rail vehicle 2, when processing the image data to identify a location of the reference target. In particular, a field of view 53A, 53B (FIG. 1) of a camera 52 (FIG. 2) will generally include one or more regions, which are not only of no immediate interest in the image processing, but due to the geometry of the image and reference target(s), are incapable of including the reference target(s) at all. In this case, the image data of the region(s) can be blocked off and not processed by the corresponding computer system 30 (FIG. 2), thereby reducing any instances of false identification of the target feature due to similar features present in the irrelevant regions.

Figure 7:
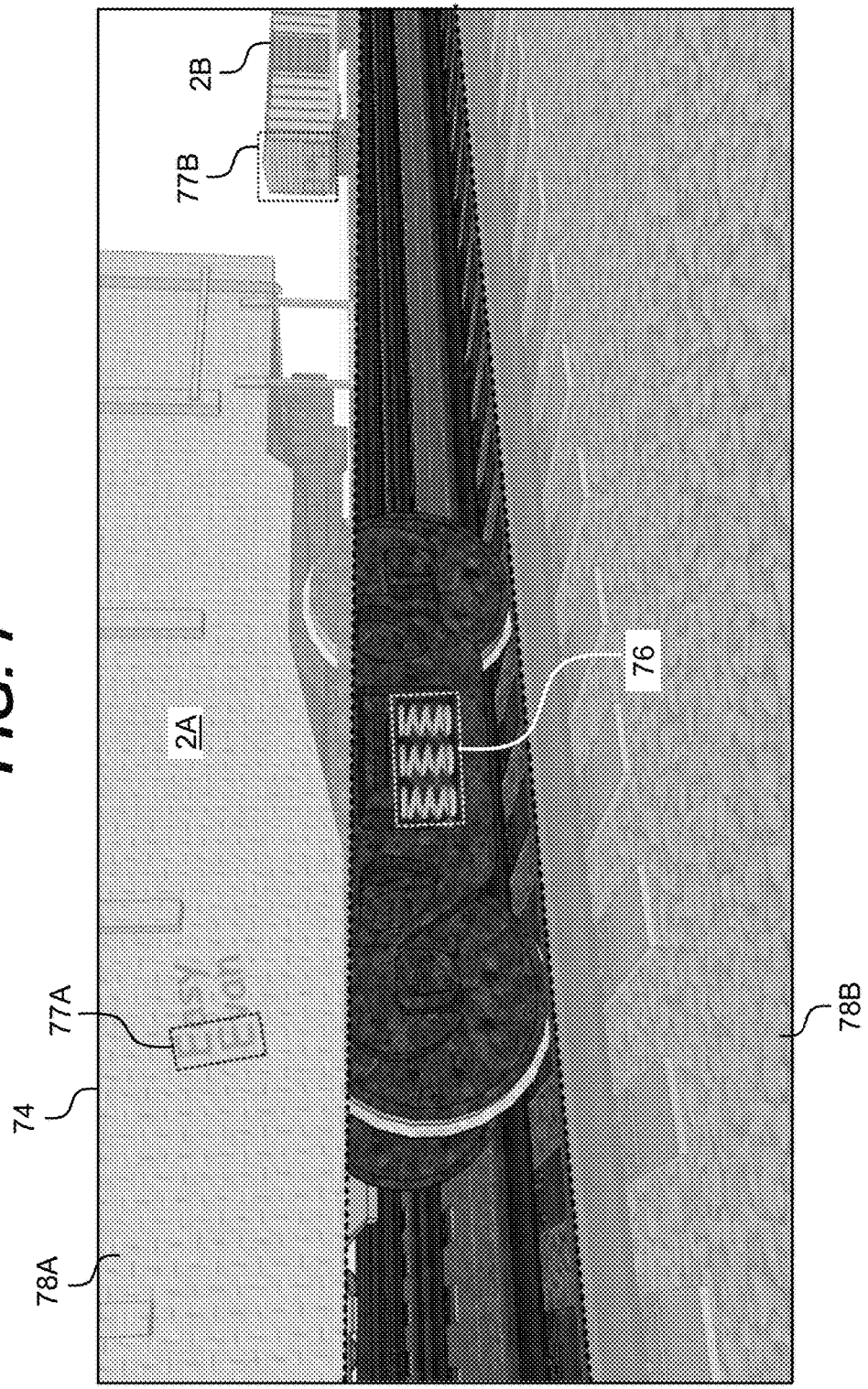
FIG. 7 shows a simulated image illustrating blocking of regions of the image data according to an embodiment.

FIG. 7 shows a simulated image 74 illustrating blocking of regions of the image data according to an embodiment. The image 74 could be acquired, for example, by a camera 52A located on an assembly 20 of the pre-screening component 12 as shown in FIG. 4. Regardless, the computer system 30 (FIG. 2) can be evaluating the image data 74 to determine a location of the springs 76 (a reference target) as described herein. In this case, the image data includes two rail vehicles 2A, 2B, each of which includes one or more potentially confounding regions 77A, 77B. In particular, the region 77A includes graffiti having sufficient diagonal lines that could produce a false identification of a location of the springs 76. Similarly, the region 77B corresponds to a portion of a distant rail vehicle 2B having a corrugated side.

However, prior to evaluating the image 74 for a location of the springs 76, the computer system 30 can mask regions 78A, 78B from processing. As a result of masking region 78A, the computer system 30 will not evaluate either of the confounding regions 77A, 77B and will therefore not need to distinguish either region 77A, 77B from the springs 76. The computer system 30 can define the mask regions 78A, 78B using any solution. For example, in the image 74, the computer system 30 can define the mask region 78B as the region below the top of the nearest rail and define the mask region 78A as the region above a point at which the truck 3 (FIG. 6) will appear in the image. For example, region 78A can be defined as a half-space whose lowest extent above a top of the rail is a standardized distance, e.g., as defined by the freight industry, and/or the like. As a result, the computer system 30 will only evaluate the central portion of the image 74, thereby eliminating many potential sources for false detections of the springs 76.

It is understood that the masking regions 78A, 78B are only illustrative of various masking regions that can be identified and utilized by the computer system 30. To this extent, a masking region can have any shape, size, and/or location in an image. The computer system 30 can identify an appropriate masking region based on, for example, the target feature or characteristic of the target feature, its horizontal and/or vertical location within the image data, and/or the like. To this extent, while springs 76 of a spring box is used as an illustrative reference target, it is understood that the computer system 30 can identify any of various types of features in image data with one or more regions masked. For example, in identifying a location of a brake rod in image data, the region of interest will include a higher region of the rail vehicle 2A, including at least a portion of the side of the rail vehicle 2A. To further limit a region of interest, the computer system 30 can use one or more vertical regions, such as a leading or trailing edge of the rail vehicle 2A, the leading edge of a first wheel on a truck 3, the trailing edge of a second wheel on the truck 3, and/or the like.

Returning to FIG. 2, in an embodiment, the computer system 30 of the pre-screening component 12 is configured to generate an equipment definition file (pre-screening data 44) corresponding to each passing rail vehicle for processing by one or more robotic devices 14 and/or remote systems 16. The equipment definition file can include, for example, data corresponding to a location of one or more reference targets corresponding to a rail vehicle in the image data and data corresponding to a position of one or more target components of the rail vehicle relative to the reference target(s). Furthermore, the equipment definition file can include additional data regarding the rail vehicle, such as a speed of the rail vehicle, a type of the rail vehicle, identification information for the rail vehicle, and/or the like.

In a further embodiment, the pre-screening component 12 includes two assemblies 20A, 20B located on opposing sides of the 4 as shown in FIG. 3, and each assembly 20A, 20B includes cameras 52A-52D configured as shown in FIG. 4. In an illustrative embodiment, as rail vehicles pass the assemblies 20A, 20B, each camera 52A-52D on each assembly 20A, 20B can acquire image data (e.g., video data) of the rail vehicles. In this case, the computer system 30 can receive image input data from eight cameras, which can be identified as upper trailing (UT), lower trailing (LT), upper leading (UL), and lower leading (LL), for each assembly 20A, 20B located on the left and right sides of the track 4. As used herein, leading image data corresponds to that data acquired by a camera 52 with a field of view facing the rail vehicle as it approaches the assembly 20A, 20B and trailing image data corresponds to that image data acquired by a camera 52 with a field of view facing the rail vehicle as it moves away from the assembly 20A, 20B.

Figure 8:
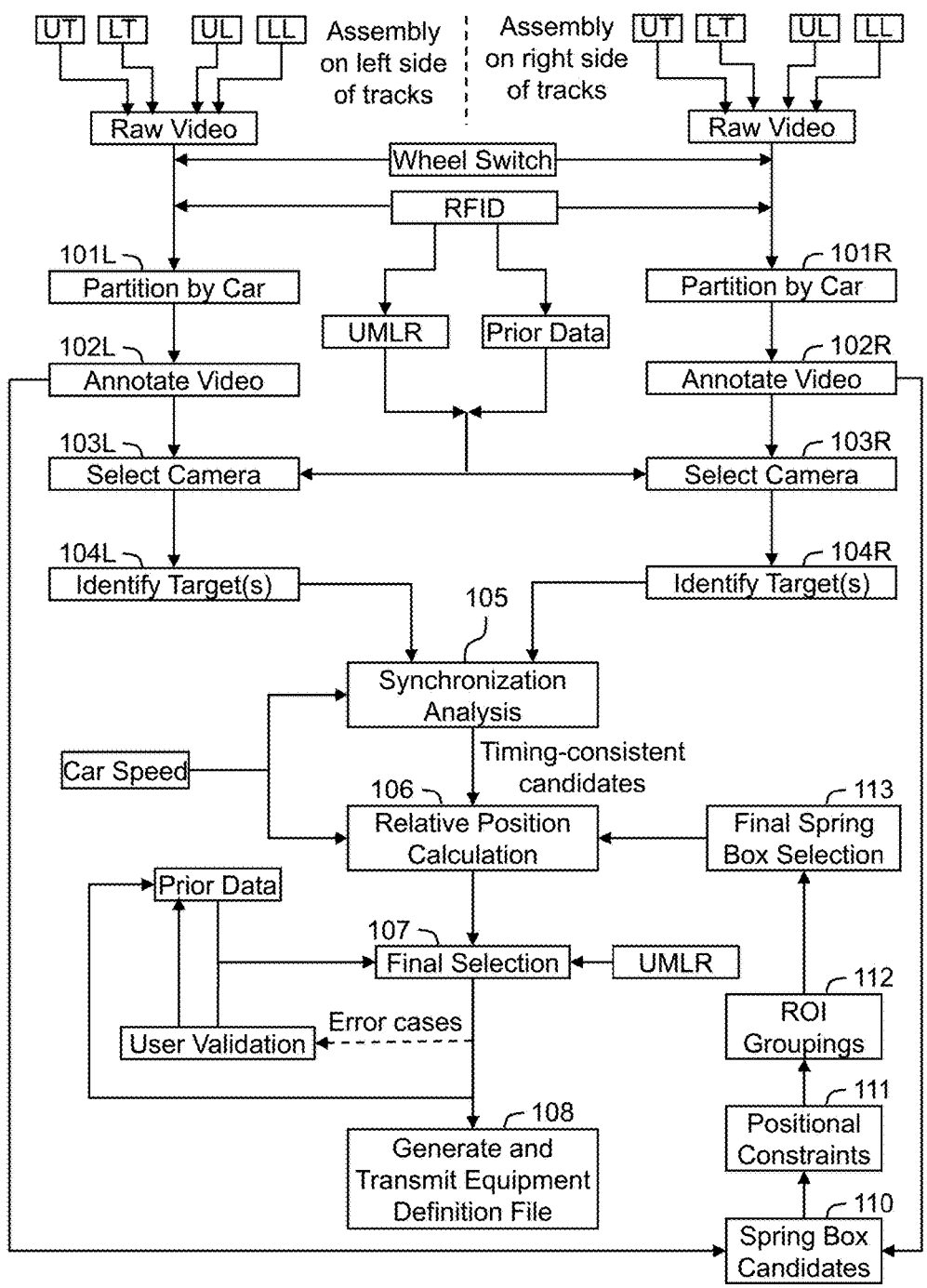
FIG. 8 shows an illustrative flow chart illustrating generation of an equipment definition file according to an embodiment.

FIG. 8 shows an illustrative flow chart illustrating generation of an equipment definition file, which can be implemented by the computer system 30 (FIG. 2), according to an embodiment. Referring to FIGS. 2-4, and 8, while rail vehicles are passing the pre-screening location, the computer system 30 can receive raw image data (video) from the various cameras 52A-52D (UT, LT, UL, LL) on each assembly 20A, 20B. Additionally, the computer system 30 can receive additional input data from one or more additional I/O devices 50, such as the wheel sensors 58A-58D (e.g., wheel switch timing data), the RFID tag reader 56 (e.g., an AEI or other type of RFID), and/or the like. In actions 101L, 101R, the computer system 30 can use the input data to partition the raw image data by rail vehicle as described herein. In actions 102L, 102R, the computer system 30 can annotate the set of image data for each rail vehicle with the relevant additional input data, such as the RFID, and/or the like.

Additionally, the computer system 30 can use identification data for a rail vehicle, such as the RFID, to obtain additional information regarding the rail vehicle. For example, the computer system 30 can provide the identification data for processing by the remote system 16, which can provide prior data acquired and/or generated from previous processing (e.g., pre-screening, maintenance, evaluation, and/or the like) of the rail vehicle. Similarly, the computer system 30 can provide identification data for processing by the railroad system 18, which can use the identification data to acquire data from an industry database, such as the Universal Machine Language Equipment Register (UMLER) database, or the like. Such data can include, for example, a type of the rail vehicle, which can have a corresponding known location for one or more components of interest, such as a brake rod. It is understood that use of the remote system 16 and railroad system 18 as described herein are only illustrative and the computer system 30 can obtain prior data and/or industry data using any solution. Use of prior data can be especially useful in a "captive fleet" application, such as a transit railroad where the rail vehicles repeatedly follow set routes. However, prior data also can be useful in a freight rail setting over a medium or long term, and/or when the prior data is available from previous processing performed at other railyards.

In actions 103L, 103R, the computer system 30 can select a subset (e.g., one or more) of the cameras 52A-52D for which the corresponding image data will be used to pre-screen the rail vehicle for a location of a particular reference target and/or component using the data acquired regarding the rail vehicle (e.g., type of rail vehicle, prior data, and/or the like). In an embodiment, the computer system 30 selects image data acquired by at least one camera 52A-52D from each side of the track 4. Should no additional data be available for the rail vehicle, the computer system 30 can initially process the image data acquired by all of the cameras 52A-52D on each side of the track 4. The initial processing may quickly identify the cameras 52A-52D providing the best image data for identifying the location of the reference target and/or component.

In actions 104L, 104R, the computer system 30 can process the selected image data to extract and identify target candidates for a set of target features (e.g., reference targets and/or components) in the image data corresponding to the rail vehicle. For example, the computer system 30 can process the image data using a detection chain. The detection chain can include any combination of one or more of various image processing approaches for detecting, extracting, and identifying target candidates known to those skilled in the art of machine vision and smart video. These approaches can include, for example, thresholding, background removal, Haar-based classifier, histogram of oriented gradients (HOG) classifier, optical flow analysis, and/or the like. The appropriate combination of image processing approaches can be selected to provide effective identification of target candidates using any solution, e.g., based on one or more attributes of a particular object, component, and/or application (e.g., presence of various confounding features, lightening, location and movement of the sun, and/or the like).

In action 105, the computer system 30 can examine the image data including at least one high-ranked target candidate, which may have been acquired from the left and/or right sides of the track 4, for synchronization. In particular, the computer system 30 can analyze the video data to determine if movement of the target candidates is synchronized with the movement of the rail vehicle. To assist the computer system 30 in examining the target candidate(s) for synchronization, the computer system 30 can use data corresponding to a speed of the rail vehicle, which can be acquired using any solution (e.g., using wheel switch data as described herein, using a separate speed sensor, such as an ultra-low-speed Doppler radar sensor, and/or the like).

The computer system 30 also can analyze the annotated image data to identify other features, such as reference targets and/or components. Such analysis can be performed prior to and/or in parallel with other analysis described herein. For example, using a spring box as an illustrative feature, in action 110, the computer system 30 can identify a set of spring box candidates in the image data. For example, the computer system 30 can implement one or more image processing approaches similar to those described in conjunction with identifying other target candidates. However, it is understood that a particular combination and/or instance of an image processing solution may vary between the applications.

In action 111, the computer system 30 can evaluate each spring box candidate with respect to known positional constraints of spring boxes. For example, a relevant industry can define a set of standards for the trucks, from which various constraints can be derived, including an upper and lower bound, a truck to truck spacing, and/or the like, which can be used to remove false positives and/or score spring box candidates according to a variance from the constraints. In response to a spring box candidate not being within the known positional constraints, the computer system 30 can determine that the spring box candidate is not a spring box. Additionally, in action 112, the computer system 30 can determine how various spring box candidates group in a given region of interest. For example, an actual spring ensemble may include a known number of springs, coils per spring, and/or the like, which can be used to reject spring box candidates not falling within these limits and/or score spring box candidates according to a variance from these limits. In action 113, the computer system 30 can make a final selection of spring box(es) from an overall scoring of the spring box candidates after the previous evaluations. For example, a spring box candidate having a higher total combined score, a higher average score, and/or the like, can be selected over a spring box candidate having a lower comparable score.

Returning to the processing of the target candidates, using the location data for the identified reference target(s) (e.g., spring boxes), in action 106, the computer system 30 can calculate a relative position of each target candidate that passes the synchronization analysis (e.g., each timing-consistent target candidate) on the rail vehicle. In an embodiment, the computer system 30 can establish a coordinate system as described herein (e.g., using a set of readily identifiable features) and use the coordinate system to determine the relative position of each timing-consistent target candidate. The computer system 30 can use the relative position to further remove target candidates. For example, a target candidate corresponding to a brake rod will not be located immediately over a spring box.

In action 107, the computer system can make a final selection of the reference targets and/or components from the set of target candidates using any solution. For example, the computer system 30 can use an overall scoring of the target candidates to select the target candidate(s) most likely to correspond to the actual reference targets and/or components. Furthermore, the computer system 30 can use additional data, such as the prior data, industry (e.g., UMLR) data, and/or the like, to select an appropriate target candidate. For example, the computer system 30 can use a set of templates of a reference target and/or component to assess a similarity of the target candidate to one or more of the templates. Additionally, the computer system 30 can use additional spatial a priori information, which can be obtained from the industry data, to identify a best match between a reference target and/or component and target candidates. When the computer system 30 is unable to distinguish between multiple target candidates for the same feature (e.g., multiple equally scored candidates, no clear candidate, and/or the like), the computer system 30 can generate an error. In this case, the computer system 30 can provide data corresponding to the target candidates and the error for evaluation by another system and/or a user. In response, the computer system 30 can receive a selection of the appropriate target candidate, e.g., after a manual evaluation. The computer system 30 also can store the selection and/or provide the selection for storage as prior data for the rail vehicle, which can assist the computer system 30 in identifying the corresponding feature during future pre-screening and/or in training the computer system 30.

Once the computer system 30 has completed all of the analysis and pre-screening operations, the computer system 30 can generate and transmit data corresponding to the results for use by one or more other systems, such as one or more robotic devices 14, the remote system 16, and/or the railroad system 18. For example, in action 108, the computer system 30 can generate and transmit an equipment definition file including data corresponding to a rail vehicle, which includes data on the locations of one or more components of the rail vehicle. It is understood that an equipment definition file can be created, modified, stored, transmitted, and/or the like, using any solution. To this extent, while referred to herein as a file, it is understood that the equipment definition file is not limited to storage as an element of a file system.

Figure 9:
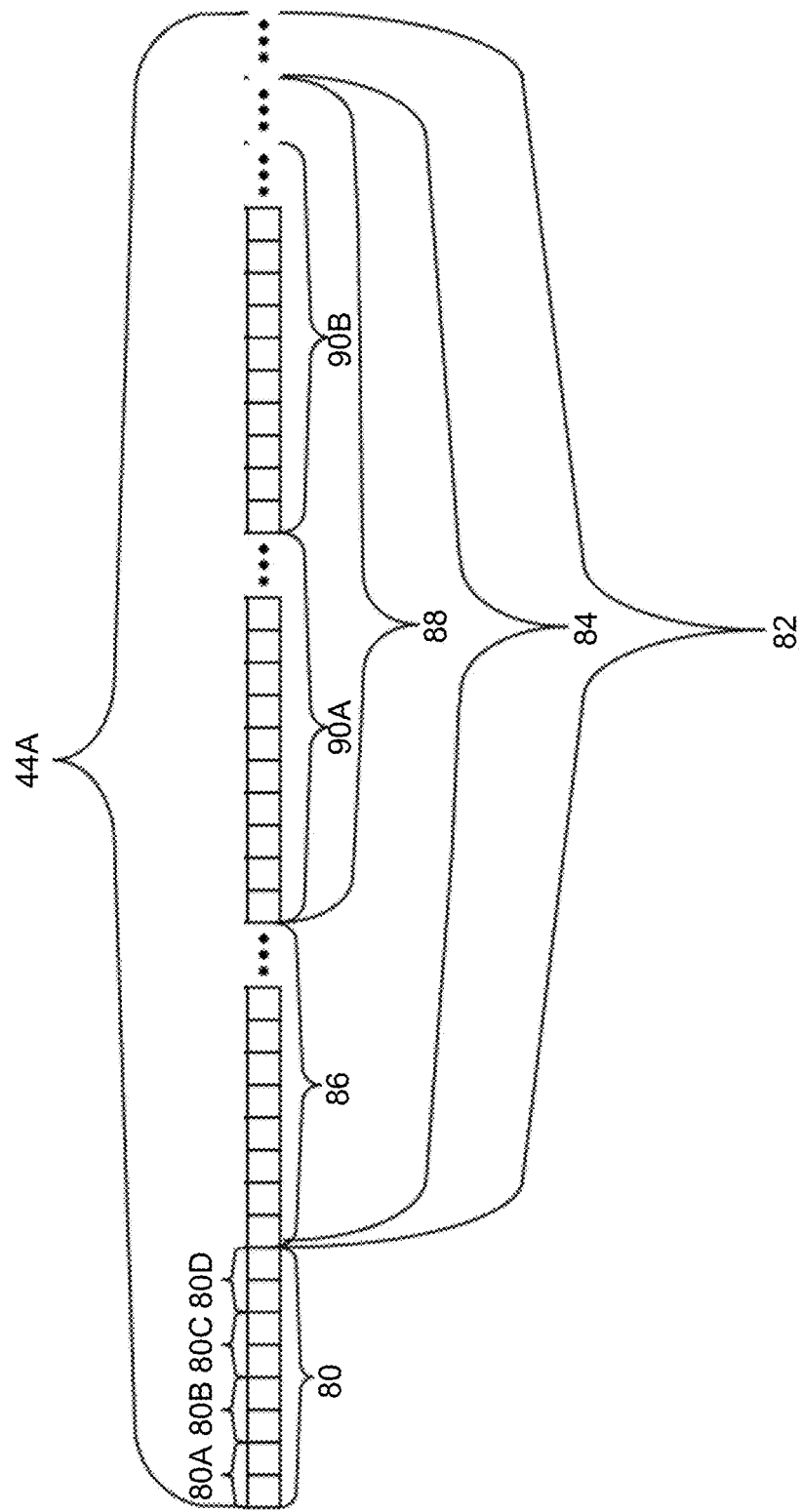
FIG. 9 shows an illustrative structure of an equipment definition file according to an embodiment.

FIG. 9 shows an illustrative structure of an equipment definition file 44A according to an embodiment. The equipment definition file 44A includes a header 80 and a rail vehicle list 82. The header 80 can include, for example, data corresponding to the equipment definition file 44A. For example, the header 80 can include a file format version 80A, a current file name 80B, identification information 80C corresponding to the pre-screening component 12 generating the equipment definition file 44A, a time/date stamp 80D, and/or the like. It is understood that the header 80 is only illustrative and can include different data, data in a different order, and/or the like. Furthermore, while not shown, it is understood that the equipment definition file 44A can include a trailer, which can include data corresponding to the equipment definition file 44A, such as an error detecting code (e.g., a cyclic redundancy check code), a terminator indicator, and/or the like).

The rail vehicle list 82 includes one or more rail vehicle entries 84 (one shown for clarity). Each rail vehicle entry 84 can include data regarding the rail vehicle 86 and a vehicle equipment list 88. Data regarding the rail vehicle 86 can vary significantly based on the application. In an embodiment, the data regarding the rail vehicle 86 includes one or more of: a vehicle initial and number; a vehicle type; a number of axles; a length of the vehicle; and/or the like. Additionally, the data regarding the rail vehicle 86 can include information regarding the rail vehicle, which may be useful in further processing the rail vehicle. For example, one of multiple robotic devices 14 (FIG. 2) may be assigned to perform an operation based on a direction of movement and/or speed of the rail vehicle. Illustrative information includes: direction of movement; speed; and/or the like.

The vehicle equipment list 88 can include one or more equipment entries 90A, 90B, each of which corresponds to a reference target and/or a component of the corresponding rail vehicle. An equipment entry 90A, 90B, can include any combination of various data regarding the corresponding component. Illustrative data includes: an equipment identifier (e.g., an identifier used for tracking which piece of equipment is being processed); an equipment type (e.g., a numeric or alphanumeric code used to identify the various relevant types of equipment); a car sector, which can identify one of a plurality of regions of a rail vehicle in which the equipment is located (e.g., left or right side of the vehicle); a location of the equipment (e.g., relative to a reference component, such as the spring box, in x, y, and z displacements); an orientation of the equipment (e.g., pitch, roll, yaw, and/or the like); etc. Additionally, an equipment entry 90A, 90B can include one or more hints for identifying the reference target and/or component in image data. Such hints can include, for example, data corresponding to: a shape or color of the component (e.g., looped, bent at a 45 degree angle, C-shaped, and/or the like for a brake rod component); a shape or color of a similar looking feature which is not the component; and/or the like. It is understood that an equipment entry 90A, 90B can include additional data, such as data corresponding to a general style of the equipment, a known prior condition of the equipment, and/or the like.

As described herein, the equipment definition file 44A provides a flexible and reliable approach to transmit data regarding an object, such as a rail vehicle, for use by another system, such a robotic device 14 (FIG. 2), in identifying and/or acting on various features of the object. As a result, the robotic device 14 can have a significantly refined operational space, thereby reducing an amount of processing capability required to be devoted to image processing on the robotic device 14. In an embodiment, for each rail vehicle, the computer system 30 (FIG. 2) provides the robotic device 14 with data identifying the relevant equipment of the rail vehicle, a location of the equipment, details which distinguish the equipment from other equipment, and/or the like, using the equipment definition file 44A. This allows the robotic device 14 to more quickly and more reliably locate the relevant equipment on which to operate and perform the operations.

Returning to FIG. 2, when not pre-screening rail vehicles, the computer system 30 and/or the remote system 16 can perform one or more operations configured to improve one or more aspects of future pre-screening of rail vehicles. For example, the computer system 30 and/or the remote system 16 can pre-load prior data and/or industry data (e.g., from the railroad system 18) regarding rail vehicles present on the next train scheduled to enter the railyard. Furthermore, the computer system 30 and/or the remote system 16 can build a knowledge base based on previous pre-screening operations, which provides overall system expectations. For example, over time, a particular type of rail vehicle may pass through the pre-screening area many times. The computer system 30 and/or the remote system 16 can regularly analyze and extract common features for the type of rail vehicle (e.g., a location of the brake rod), which can be used to further refine the information initially required to locate the feature when pre-screening a rail vehicle of the corresponding type.

The storage and processing of long-term prior data by the computer system 30 and/or the remote system 16 can enable further evaluations and/or actions with respect to the rail vehicles. For example, when a given type of rail vehicle is known to have a ladder at a particular location, a derived equipment list for a rail vehicle of the given type that does not include a ladder indicates the presence of a defect in the rail vehicle. When a rail vehicle has been processed multiple times (e.g., at the same pre-screening location or other pre-screening location(s) for which prior data is available), the computer system 30 and/or the remote system 16 can compare its status on prior passes with its current status, note changes, find defects, and analyze multiple entries to predict changes to the rail vehicle due to long-term wear.

As described herein, the processing of rail vehicles is only illustrative of many types of applications to which aspects of the invention can be applied. For example, another application can be directed to inspecting other types of motor vehicles, such as commercial trucks, a fleet of passenger vehicles, and/or the like. In a more particular embodiment, aspects of the invention can be utilized at an inspection way station. For example, a pre-screening component 12 (FIG. 2) can include one or more assemblies located on a roadway or approach ramp prior to the inspection way station, and can evaluate any combination of various attributes of the approaching commercial vehicles. Illustrative attributes include: registration information; brake condition; emissions; and/or the like, and can determine whether the commercial vehicle requires further inspection at the inspection way station. For each vehicle selected for further inspection, the pre-screening component 12 can forward considerable data for use by the inspector (e.g., to a remote system 16 used by the inspector), with any areas of interest flagged and specified so that the inspector can examine only the relevant portions of the vehicle. Such an approach can reduce wait times for such inspections and/or improve safety by facilitating more comprehensive inspections of potential problems identified during the pre-screening.

While shown and described herein as a method and system for pre-screening vehicles, it is understood that aspects of the invention further provide various alternative embodiments. For example, in one embodiment, the invention provides a computer program fixed in at least one computer-readable medium, which when executed, enables a computer system to pre-screen vehicles using a process described herein. To this extent, the computer-readable medium includes program code, such as the pre-screening program 40 (FIG. 2), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the pre-screening program 40 (FIG. 2), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for pre-screening vehicles. In this case, the generating can include configuring a computer system, such as the computer system 30 (FIG. 2), to implement a method of pre-screening vehicles described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
   a pre-screening component including:
      a first set of cameras for acquiring image data of a vehicle, wherein the first set of cameras are configured to acquire image data including at least one component of the vehicle relevant to an operation to be performed on the vehicle; and
      a computer system including means for pre-screening the vehicle, the means for pre-screening including:
         processing the image data to identify a set of reference targets visible in the image data of the vehicle;
         identifying, using the set of reference targets, a location of the at least one component of the vehicle relevant to the operation to be performed on the vehicle, wherein at least one reference target in the set of reference targets comprises a feature of the vehicle; and
         generating pre-screening data for the vehicle, wherein the pre-screening data includes data corresponding to the set of reference targets identified in the image data of the vehicle and data for locating the at least one component of the vehicle relative to a location of at least one of the set of reference targets; and
   a robotic device configured to perform the operation on the vehicle in an autonomous or semi-autonomous manner, wherein the robotic device includes:
      a second set of cameras for acquiring image data of the vehicle distinct from the first set of cameras; and
      means for locating the at least one component of the vehicle relevant to the operation, the means for locating including:
         locating the at least one of the set of reference targets in the image data acquired by the second set of cameras; and
         using the pre-screening data and the located at least one of the set of reference targets to locate the at least one component in the image data acquired by the second set of cameras.

2. The system of claim 1, wherein the pre-screening data further includes a vehicle type for the vehicle, and wherein the robotic device further uses the vehicle type to perform the operation.

3. The system of claim 1, wherein the pre-screening data comprises an equipment definition file for the vehicle including data corresponding to the pre-screening component, data corresponding to a date and time the vehicle was imaged, and data corresponding to a vehicle type.

4. The system of claim 1, wherein the vehicle comprises a rail vehicle.

5. The system of claim 4, wherein the operation comprises at least one of: a brake bleeding operation or a decoupling operation.

6. The system of claim 4, wherein the pre-screening component further selects one of a plurality of robotic devices to perform the operation on the vehicle based on the pre-screening.

7. The system of claim 1, wherein at least one of the pre-screening component or the robotic device is mobile.

8. The system of claim 1, wherein the first set of cameras includes a first camera configured to acquire image data from a perspective similar to a perspective of a third camera in the second set of cameras of the robotic device and a second camera configured to acquire image data from a perspective substantially different from the perspective of the third camera of the robotic device.

9. A system comprising:
a pre-screening component including:
a set of cameras for acquiring image data of an object, wherein the first set of cameras are configured to acquire image data including at least one component of the object; and
a computer system including means for pre-screening the object, the means for pre-screening including:
processing the image data to identify a set of reference targets visible in the image data of the object, wherein at least one reference target in the set of reference targets comprises a feature of the object;
identifying, using the set of reference targets, a location of the at least one component of the object;
generating pre-screening data for the object, wherein the pre-screening data includes data corresponding to the set of reference targets identified in the image data of the object and data for locating the at least one component of the object relative to a location of at least one of the set of reference targets; and
providing the pre-screening data for use in further processing the object.

10. The system of claim 9, wherein the computer system for pre-screening the object further generates an equipment definition file for the object based on the pre-screening, wherein the equipment definition file includes an entry for each of the set of reference targets and an entry for each of the at least one component of the object.

11. The system of claim 10, further comprising means for evaluating the object, the means for evaluating including:
evaluating a plurality of equipment definition files for at least one of: the object or a plurality of objects of the same type; and
detecting at least one of: a set of differences or a set of similarities in the plurality of equipment definition files.

12. The system of claim 11, wherein the means for evaluating further includes identifying an anomaly present in the object based on the evaluating and detecting.

13. The system of claim 9, further comprising a robotic device including means for performing an operation on the object in an autonomous or semi-autonomous manner, the means for performing including:
acquiring image data of the object using a set of cameras located on the robotic device;
processing the image data using the pre-screening data to identify at least one of the set of reference targets visible in the image data of the object;
processing the image data using the pre-screening data and the identified at least one of the set of reference targets to identify at least one component of the object in the image data; and
performing the operation on the at least one component of the object.

14. The system of claim 13, wherein the computer system for pre-screening the object further acquires at least one of: industry data corresponding to the object or prior pre-screening data corresponding to the object, and includes data corresponding to the at least one of: industry data or prior pre-screening data, in the pre-screening data, and wherein the robotic device further uses the data corresponding to the at least one of: industry data or prior pre-screening data, to perform the operation.

15. The system of claim 9, wherein the processing the image data to identify a set of reference targets includes, for at least one reference target, masking a set of areas of the image data incapable of including the at least one reference target.

16. A railyard comprising:
a pre-screening component including:
a set of cameras for acquiring image data of each rail vehicle moving past the pre-screening component, wherein the first set of cameras are configured to acquire image data including at least one component of the rail vehicle relevant to an operation to be performed on the rail vehicle; and
a computer system including means for pre-screening the rail vehicle, the means for pre-screening including:
processing the image data to identify a set of reference targets visible in the image data of the rail vehicle, wherein at least one reference target in the set of reference targets comprises a feature of the rail vehicle;
identifying, using the set of reference targets, a location of the at least one component of the rail vehicle relevant to the operation to be performed on the rail vehicle; and
generating pre-screening data for the vehicle, wherein the pre-screening data includes data corresponding to the set of reference targets and data for locating the at least one component relative to a location of at least one of the set of reference targets; and
a set of robotic devices, wherein at least one robotic device in the set of robotic devices includes means for locating the at least one component of the vehicle relevant to the operation, the means for locating including:
locating the at least one of the set of reference targets in the image data acquired by the robotic device; and
using the pre-screening data and the located at least one of the set of reference targets to locate the at least one component in the image data acquired by the robotic device to perform the operation on the vehicle.

17. The railyard of claim 16, wherein the set of reference targets includes a spring box of a truck of a rail vehicle.

18. The railyard of claim 16, wherein the operation comprises bleeding the brakes of the rail vehicle, and wherein the at least one component comprises a brake rod of the rail vehicle.

19. The railyard of claim 16, wherein the computer system for pre-screening the rail vehicle further includes data corresponding to a set of hints for locating the at least one component in the pre-screening data.

20. The railyard of claim 16, wherein the computer system for pre-screening the rail vehicle further includes data corresponding to a type of the rail vehicle in the pre-screening data.

* * * * *